United States Patent [19]

Narula et al.

[11] Patent Number: 4,701,380

[45] Date of Patent: Oct. 20, 1987

[54] CURABLE SILICONE COMPOSITION FOR CORROSION PROTECTION

[75] Inventors: Dipak Narula; Anh Be; Charles P. Zemanek, all of Midland, Mich.

[73] Assignee: Dow Corning Corporation, Midland, Mich.

[21] Appl. No.: 218

[22] Filed: Jan. 2, 1987

[51] Int. Cl.[4] .............................................. B32B 9/04
[52] U.S. Cl. .................................... 428/447; 427/387; 427/388.1; 428/450; 524/860; 524/861; 528/18; 528/31; 528/33; 528/34
[58] Field of Search .......................... 427/387, 387.1; 428/447, 450; 524/860, 861; 528/31, 34, 33, 18

[56] References Cited

U.S. PATENT DOCUMENTS 4,322,518  3/1982  Blizzard ................................ 528/15
4,537,829  8/1985  Blizzard ................................ 428/429

Primary Examiner—Melvyn I. Marquis
Attorney, Agent, or Firm—Alexander Weitz

[57] ABSTRACT

A composition which provides excellent corrosion protection to metals, particularly ferrous metals which are to be exposed to moisture and/or salt, is disclosed. The composition comprises (I) a reaction product (or blend) of a resinous copolymeric siloxane solution with a liquid organohydrogenpolysiloxane, (II) a hydroxy-functional diorganopolysiloxane and (III) an organosilane. The composition may be cured on metal surfaces, either at room temperature or at elevated temperature, to provide a strongly adhering corrosion protective coating.

24 Claims, No Drawings

CURABLE SILICONE COMPOSITION FOR CORROSION PROTECTION

The present invention relates to improved curable compositions. More particularly, the present invention relates to curable silicone coating compositions which provide corrosion resistance to metal surfaces, said compositions comprising a liquid copolymeric organopolysiloxane, a polydiorganosiloxane and an organosilane.

In U.S. Pat. No. 4,322,518, assigned to the assignee of the present invention and hereby incorporated by reference, Blizzard discloses silicone coating compositions which comprise a solventless liquid copolymeric organopolysiloxane comprising a curable silicone polymer fluid or gum and a liquid $SiO_2$-based resin as the sole curing agent for the fluid or gum. When cured on various substrates, these silicone compositions provide release coatings having controllable release forces for adhesives adhered thereto.

Blizzard and Swihart, in U.S. Pat. No. 4,537,829, assigned to the assignee of the present invention teach compositions similar to those described by Blizzard, cited supra. In addition to the curable silicone polymer and liquid $SiO_2$-based resin, these compositions further comprise an organosilicon resin consisting essentially of dimethylvinylsiloxy units, trimethylsiloxy units and $SiO_{4/2}$ units and a hydrosilylation catalyst. These compositions, when cured, provided improved resistance to fuels and a high degree of corrosion protection to metal substrates.

SUMMARY OF THE INVENTION

It has now been found that certain compositions prepared according to the disclosures of Blizzard, cited supra, provide excellent corrosion protection to metals, particularly ferrous metals, when cured on the surfaces thereof. It has further been discovered that, while such compositions readily form corrosion resistant coatings when cured at elevated temperatures, the same coatings do not adhere to metals when the cure is accomplished at room temperature. This aspect severely limits the utility of the compositions in commercial applications which require coating of surfaces too large to heat in ovens or the coating of components which are sensitive to heat.

The present invention overcomes such disadvantage by including in the curable compositions certain organosilanes to provide coatings which adhere to metals when cured either at room temperature or at elevated temperatures. Surprisingly, particularly preferred compositions can result in improved corrosion resistance of the coated metal surfaces relative to the compositions suggested by Blizzard, cited supra.

The present invention therefore relates to a composition comprising: (I) from about 1 to 99 parts by weight of a liquid organopolysiloxane copolymer, prepared by a method comprising (A) forming a homogeneous mixture having an acid number greater than zero and consisting essentially of (a) an organic solvent solution of a resinous copolymeric siloxane containing silicon-bonded hydroxyl radicals and consisting essentially of $R_3SiO_{\frac{1}{2}}$ units and $SiO_{4/2}$ units wherein the ratio of $R_3SiO_{\frac{1}{2}}$ units to $SiO_{4/2}$ units is 0.6:1 to 0.9:1 and each R denotes, independently, a monovalent hydrocarbon radical and (b) a liquid organohydrogenpolysiloxane wherein each organic radical is, independently, a monovalent hydrocarbon radical, there being an average of at least one silicon-bonded hydrogen radical per molecule of said organohydrogenpolysiloxane, and (B) heating said homogeneous mixture to remove substantially all of said organic solvent therefrom; (II) from about 1 to 99 parts by weight of a hydroxy-functional diorganopolysiloxane having the average formula $$(HO)R'''_2SiO(R'''SiO)_cSiR'''_2(OH)$$

wherein $R'''$ is a group selected from alkyl, cycloalkyl, haloalkyl, aromatic or haloaromatic radicals and c has a value sufficient to provide a viscosity of about 1 to 1,000,000 Poise at 25° C. for the diorganopolysiloxane: and (III) from about 0.1 to 10 parts by weight, per 100 parts of said component (I) plus component (II), of at least one organosilane having the formula $$QSi(OR'''')_3$$

wherein the group Q is selected from vinyl, 3-glycidoxypropyl, 3-methacryloxypropyl or 3-(N-styrylmethyl-2-aminoethylamino)propyl hydrochloride groups and $R''''$ is selected from alkyl groups having 1 to 4 carbon atoms, alkoxyalkyl groups having a total of up to 5 carbon atoms or the acetyl group.

This invention further relates to a similar composition to that described above, wherein said component (I) is prepared by simply mixing said components (a) and (b) without subsequent heating and removal of solvent therefrom.

DETAILED DESCRIPTION OF THE INVENTION

Component (I) of the compositions of this invention is a liquid copolymeric organopolysiloxane. It may be prepared by reacting (a) a resinous copolymeric siloxane with (b) a liquid organohydrogenpolysiloxane. Alternatively. component (I) may be prepared by simply blending reactants (a) and (b) and using this mixture directly in the compositions of the present invention.

Component (a) that is used to prepare the liquid copolymeric organopolysiloxane (I) is an organic solvent solution of a resinous copolymeric siloxane which consists essentially of $R_3SiO_{\frac{1}{2}}$ siloxane units and $SiO_{4/2}$ siloxane units.

The resinous copolymeric siloxane portion of component (a) consists of from 0.6 to 0.9 $R_3SiO_{\frac{1}{2}}$ units for every $SiO_{4/2}$ unit. Each R denotes a monovalent hydrocarbon radical; such as an alkyl radical, such as methyl, ethyl, isopropyl, butyl and hexyl; an alkenyl radical. such as vinyl and allyl an aryl radical. such as phenyl, tolyl and xylyl; an arylalkyl radical, such as beta-phenylthyl and beta-phenylpropyl, and a cycloaliphatic radical, such as cyclopentyl, and cyclohexyl. Preferably all R radicals in component (a) are lower alkyl radicals although a minor portion of them can be replaced with other monovalent hydrocarbon radicals such as the vinyl radical and/or the phenyl radical to provide additional properties for the resinous copolymer such as the reactivity attendant therewith.

In a preferred curable coating composition of this invention the resinous copolymeric siloxane portion of component (a) consists essentially of $(CH_3)_3SiO_{\frac{1}{2}}$ siloxane units and $SiO_{4/2}$ siloxane units, in the number ratio of about 0.75.

Resinous copolymeric siloxanes consisting of $R_3SiO_{\frac{1}{2}}$ units and $SiO_{4/2}$ units are well known in the art and are described by, for example, Daudt et al., U.S. Pat. No. 2,676,182, the disclosure of which is hereby incorporated by reference.

Resinous copolymeric siloxanes are typically prepared in an organic solvent which can conveniently serve as the organic solvent portion of component (a). The particular organic solvent portion of component (a) is not critical and can be, for example, an aliphatic hydrocarbon, an aromatic hydrocarbon or halogenated derivatives of either, or mixtures thereof. Particularly useful organic solvents include benzene, toluene, xylene, trichloroethylene and mineral spirits.

Component (b) that is used to prepare the liquid copolymeric organopolysiloxane (I) is any liquid organohydrogenpolysiloxane containing an average of at least one silicon-bonded hydrogen radical per molecule, and can have a linear, cyclic or branched structure or combinations thereof. Thus component (b) has the unit formula $R'_mH_nSiO_{(4-m-n)/2}$ wherein m and n denote positive numbers whose sum is less than 4, preferably from 1.9 to 2.1. The organic radicals (R') in component (b) can be any of the R radicals denoted above. Preferably, although not necessarily, the organic radicals (R') in component (b) are the same as the organic radicals (R) in component (a).

Examples of organohydrogenpolysiloxanes that are suitable for use as component (b) include cyclic organohydrogenpolysiloxanes of the unit formula $R'_mH_{2-m}SiO$ such as $[(CH_3)(H)SiO]_x$ wherein x is 3, 4, 5, 6 and higher and $[(CH_3)(H)SiO]_y[(CH_3)_2SiO]_z$ wherein the sum of y plus z is 3, 4, 5, 6 and higher, and linear organohydrogenpolysiloxanes of the formula $$R''R'_2SiO(R'_2SiO)_a(R'HSiO)_bSiR'_2R'',$$

such as

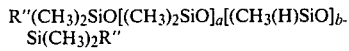

wherein R'' denotes H or methyl and a and b each denote zero or a number greater than zero, provided there is at least one silicon-bonded hydrogen radical per molecule such as $$H(CH_3)_2SiO[(CH_3)_2SiO]_aSi(CH_3)_2H,$$
$$(CH_3)_3SiO[(CH_3)(H)SiO]_bSi(CH_3)_3,$$

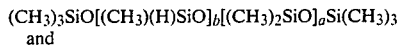

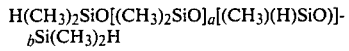

An organohydrogenpolysiloxane having the formula $$(CH_3)_3SiO[(CH_3)(H)SiO]_bSi(CH_3)_3$$

wherein b has an average value of from 30 to 70 is a highly preferred component (b). It is particularly preferred that b is about 35.

Component (I) of the present invention, preparation of which is described infra, preferably consists essentially of a devolatilized reaction product of components (a) and (b). Alternately, it has been found that component (I) may also consist essentially of a blend of components (a) and (b) formed at room temperature wherein the solvent introduced by component (a) is retained when forming the curable silicone compositions of this invention. On a solids basis, the organohydrogenpolysiloxane (i.e., component b) content of component (I) varies between about 10 and 90 weight percent of the total blend or reaction product. Preferably, the organohydrogenpolysiloxane content of component (I) varies between about 40 and 60 weight percent and most preferably it is about 50 weight percent on a solids basis. Herein, the term "solids basis" denotes the non-solvent content of any composition or component.

When component (I) is a reaction product of components (a) and (b), a homogeneous mixture is formed by thoroughly mixing the desired amounts of component (a) and component (b) and, if necessary, an acid, preferably a strong acid such as hydrochloric acid, to provide an acid number greater than zero therefor. Preferably the acid number of the homogeneous mixture, on a solids basis, has a value of from 0.1 to 1. Preferably component (a) is sufficiently acidic, as prepared, to provide this acidity for the homogeneous mixture. Herein, acid number is the number of mg of potassium hydroxide required to neutralize 1 gram of sample (solids basis) using Bromocresol Purple as the acid/base indicator.

The resulting homogeneous mixture is immediately or subsequently heated to volatize the organic solvent therefrom. Said heating is preferably initially done at atmospheric pressure and is then continued at reduced pressure to accelerate the removal of said solvent.

In a preferred embodiment of this invention the homogeneous mixture of (a) plus (b) is heated to about 150° C. at atmospheric pressure and is then subjected to a gradually decreasing pressure, without an increase in temperature, to remove substantially all of the organic solvent therefrom. By substantially it is meant herein that the liquid copolymeric organopolysiloxane contains less than about 5 percent, and preferably less than about 1 percent, by weight organic solvent.

Alternatively, the homogeneous mixture can be partially devolatilized at room temperature, such as by evaporation, and the partially devolatilized mixture then heated to remove substantially all of the organic solvent therefrom.

The liquid copolymeric organopolysiloxanes (I) contain silicon-bonded hydroxyl radicals and/or silicon-bonded hydrogen radicals which provide chemical reactivity therefor in the compositions of this invention.

Further details dealing with the preparation of component (I) by this method, as well as descriptions of components (a) and (b), may be found in U.S. Pat. No. 4,322,518, cited supra.

When component (I) is a room temperature blend of components (a) and (b), its preparation simply consists of forming a homogeneous solution between these ingredients. As in the case of the reaction product, described above, an acid number greater than zero is required and an acid number between about 0.1 and 1, on a solids basis, is preferred.

Component (II) of this invention is a polydiorganosiloxane having the general formula $$(HO)R'''_2SiO(R'''_2SiO)_cSiR'''_2(OH)$$

wherein R''' denotes a monovalent hydrocarbon radical selected from the group of R radicals indicated above for component (I). For the purpose of this invention, at least 95 percent of the R''' radicals are methyl (Me) and it is preferred that all R''' radicals are methyl. Herein, c has a value which is sufficient to provide a viscosity for component (II) of about 1 to 1,000,000 Poise at 25° C. Preferably, the viscosity of component (II) is about 200,000 P at 25° C. and this component is ordinarily dissolved in a solvent, such as toluene, xylene, naptha spirits, VMP naptha, low molecular weight ketones or hexane, before combining with components (I) and (III) of this invention.

Polydiorganosiloxanes which are suitable for use as component (II) are well known in the art and many of these fluids or gums are available commercially. Therefore, further description of methods for the preparation of such materials is not detailed herein.

Component (III) of the present invention is an organosilane having the general formula $QSi(OR'''')_3$. The group Q is selected from $CH_2=CH-$,

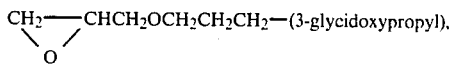

$CH_2=C(CH_3)C(O)OCH_2CH_2CH_2-$ (3-methacryloxypropyl) or $HCl\cdot CH_2=CH(C_6H_4)CH_2NHCH_2CH_2NH(CH_2)_3-$ (3-(N-styrylmethyl-2-aminoethylamino)-propyl hydrochloride) groups. In the above formula, $R''''$ may be an alkyl group having 1 to 4 carbon atoms, such as methyl, ethyl, propyl, isopropyl, butyl or isobutyl. Alternatively, $R''''$ may be an alkoxyalkyl group having a total of up to 5 carbon atoms, such as $CH_3OCH_2CH_2-$, $CH_3OCH_2CH_2CH_2-$, $CH_3CH_2OCH_2CH_2CH_2-$ or $CH_3OCH_2CH_2CH_2CH_2-$. The group $R''''$ may also be the acetyl group. Combinations of different organosilanes are also contemplated for use as component (III) of this invention.

Specific examples of component (III) suitable for use in the present invention are 3-glycidoxypropyltrimethoxysilane 3-(N-styrylmethyl-2-aminoethylamino)-propyltrimethoxysilane hydrochloride, 3-methacryloxypropyltrimethoxysilane, vinyltrimethoxysilane, vinyltriacetoxysilane and vinyltris(2-methoxyethoxy)silane.

It is preferred that the Q group of component (III) is selected from the vinyl or 3-glycidoxypropyl groups and $R''''$ is selected from the methyl or acetyl groups. Particularly preferred organosilanes are 3-glycidoxypropyltrimethoxysilane and mixtures of 3-glycidoxypropyltrimethoxysilane with vinyltriacetoxysilane, said mixtures being preferably heated for 1–4 hours at about 150° C. and containing approximately equal parts by weight of each silane.

The organosilanes of component (III) are well known in the art and many of them are commercially available, hence further description of methods of preparation will not be addressed herein.

The compositions of this invention can further comprise typical silicone adjuvants such as catalysts, fillers, pigments, dyes and cure-control additives, if desired.

The compositions of this invention are prepared by thoroughly mixing, on a solids basis, from about 1 to 99 parts by weight, preferably from 30 to 70 parts, of component (I) with from about 1 to 99 parts by weight, preferably from 30 to 70 parts, of component (II). Based on 100 parts by weight of components (I) plus (II), from about 0.1 to 10 parts by weight, preferably from 1 to 5 parts, of component (III) is added to form a homogeneous mixture of the three components. As far as is known, the order of mixing is not critical to the operability of this invention. In highly preferred embodiments, components (I) and (II) are each utilized at about 50 parts by weight (solids basis) and the preferred organosilanes, recited above, incorporated at about 1 to 5 parts by weight based on the 100 parts of total solids of (I) plus (II).

The compositions of the present invention find particular utility as coating compositions for metal substrates. When applied as 100% solids or from solution and cured on such substrates as iron, steel, aluminum, brass or copper, coatings comprising these compositions provide excellent corrosion protection to the metal surfaces. This is particularly true for the case of ferrous metals exposed to moisture and salt. Moreover, the compositions of the present invention can be cured at room temperature and still form strongly adhering coatings on such substrates. This latter benefit is not enjoyed by similar coating compositions which do not include the particular organosilanes of component (III). Such systems, as already discussed above, must be cured at elevated temperatures to provide good adhesion between the coating and metal surfaces.

To form such coating compositions, the compositions of this invention are typically diluted with a sufficient quantity of a good solvent in order to provide a desired coating composition viscosity. Such solvents as hexane, heptane, toluene, mineral spirits or ketones are suitable for this purpose, mineral spirits and heptane being preferred. Alternatively, a 100% solids system is also contemplated herein, particularly when component (II) has a low viscosity.

In addition to the above mentioned solvents, the coating compositions may include a curing amount of a curing catalyst. This is particularly required for the coating compositions which are to be cured at room temperature. Catalysts suitable for use in this invention include any of the compounds which are known to facilitate the condensation reactions between SiOH groups and between SiOH and SiH groups. For example, the catalysts contemplated may be salts of heavy metals, such as dibutyltin diacetate and stannous octoate. In preferred embodiments comprising 50 parts each of components (I) and (II) and between 1 and 5 parts component (III), approximately 2.5 parts of dibutyltin diacetate (all proportions being on a solids basis) provides coating compositions which cure at room temperature within about 8–72 hours and adhere strongly to steel surfaces.

The coating compositions of this invention may be applied to metal surfaces by any of the methods commonly practiced in the coating arts. For example, substrates may be dipped, brushed, sprayed or flow coated. Optimal amounts of solvent and catalyst to be included in such coating compositions may readily be determined by routine experimentation.

After coating of the metal substrates with the coating compositions of this invention, the coatings, which typically should be at least 1 mil in thickness, are cured. This may be done at room temperature (i.e. about 25° C.) or may be carried out at an elevated temperature ranging from 50° to 250° C. preferably from 100° to 150° C.

EXAMPLES

The following examples are presented to further illustrate the compositions of this invention, but are not to be construed as limiting the invention, which is delineated in the appended claims. All parts and percentages in the examples are on a weight basis unless indicated to the contrary and viscosities are measured at 25° C.

EXAMPLE 1

A liquid organopolysiloxane copolymer was prepared by the methods of U.S. Pat. No. 4,310,678. A 70% xylene solution of a siloxane resin copolymer consisting essentially of $(CH_3)_3SiO_{\frac{1}{2}}$ units and $SiO_2$ units in a molar ratio of approximately 0.75:1, was mixed at a level of 59 parts with 41 parts of a liquid organohydrogenpolysiloxane having the average formula

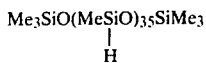

using a nitrogen purge. Xylene solvent was removed as this mixture was heated under a vacuum of about 100 mm Hg at 150° C. for 2 hours to yield a product containing a 1:1 weight ratio of the siloxane resin copolymer to the organohydrogenpoly-siloxane. The product organopolysiloxane copolymer had a viscosity of 1896 cP, a hydroxyl content of 1.55%, a non-volatile content of 99.0% and a silicon-bonded hydrogen content of 0.778%.

(COMPARATIVE) EXAMPLE 2

One hundred grams of the liquid organopolysiloxane copolymer of Example 1 was mixed with 332 grams of a toluene solution containing 32% of a silanol-ended dimethylpolysiloxane gum, having a viscosity of about 200,000 Poise, and 360 grams of heptane solvent. This combination was thoroughly blended to obtain a clear, homogeneous coating solution which was then catalyzed with 5 grams of dibutyltin diacetate.

The coating solution was "flow" coated on a precleaned cold-rolled steel panel by pouring the solution onto the surface of the panel, which was tilted at a 45 degree angle from the vertical, and allowing the excess solution to run off the panel. The resulting coating was allowed to cure at room temperature (R.T.) for about 15 minutes and was then further cured in an air oven at 150° C. for 10 minutes. A duplicate panel was prepared in an identical fashion.

Two more panels were coated as described above, but were only subjected to cure at room temperature (i.e., approximately 25° C.) for 2 hours. In each case, the final cured coating thickness was in the range of about 0.8 to 1.7 mils.

The coatings were scribed with an "X" near the center of each panel and subjected to salt spray (fog) testing according to ASTM test method B 117-73. using a sodium chloride concentration of 5% and a temperature of 98 F. (37° C). Before placing the coated panels in the salt spray apparatus, the edges of each panel were covered with KAPTON tape in order to eliminate edge corrosion effects. After exposure, the panels were rinsed with distilled water before being evaluated. Results after 1536 hours of exposure are reported in Table 1, below.

In Table 1, the overall extent of corrosion is represented by a number ranging from 0 to 100 as a measure of the relative "undercutting" or propagation of the corrosion boundary beyond the scribe lines. Undercutting of greater than ¼ of an inch (i.e., total width between corrosion boundaries along the scribe lines) was considered a failure and given a rating of 100, while a rating of zero indicated no undercutting beyond the initial scribe lines. In addition to appearance, this rating reflects relative film integrity, as determined by touch. It is believed that a rating of 20 or less suggests good corrosion protection and film integrity at this exposure duration.

EXAMPLES 3–5

Three catalyzed coating solutions were prepared as in (Comparative) Example 2. These solutions were thoroughly mixed with 1,5, and 7.5 parts of 3-glycidoxypropyltrimethoxysilane (Silane A) based on 100 parts solids in said coating solution, respectively. The compositions containing Silane A were used to coat steel panels as in (Comparative) Example 2 (i.e., 2 panels for each coating solution). Evaluations of the respective cured films are again presented in Table 1, below.

EXAMPLES 6–8

Three catalyzed coating solutions were prepared as in (Comparative) Example 2. These solutions were thoroughly mixed with 1,5, and 7.5 parts of a silane blend based on 100 parts solids in said coating solution, respectively. The silane blend (Silane B) consisted of a 50:50 mixture of vinyltriacetoxysilane and 3-glycidoxypropyltrimethoxysilane which had been heated for four hours at about 145° C. and had a specific gravity of 1.116 g/cc, a refractive index of 1.4239 and a viscosity of 3.91 cS, all said properties being measured at 25° C. The compositions containing Silane B were used to coat steel panels as in (Comparative) Example 2 (i.e., 2 panels for each coating solution). Evaluations of the respective cured films are again presented in Table 1, below.

(COMPARATIVE) EXAMPLE 9

A solution consisting of 34 parts of a silanol-ended dimethylpolysiloxane gum having a viscosity of about $10^5$ Poise and containing about 1% pyrogenic silica, 1 part of the liquid organohydrogenpolysiloxane used in Example 1 and 65 parts of xylene, was prepared. A blend of 332 grams of this solution with 100 grams of the liquid organopolysiloxane copolymer of Example 1 and 360 grams of heptane solvent was prepared. This combination was thoroughly mixed to obtain a clear, homogeneous solution which was then catalyzed with 5 grams of dibutyltin diacetate.

The above catalyzed coating solution was used to prepare coated panels as described in (Comparative) Example 2. Evaluation of corrosion protection of the cured films was carried out as described above and the results summarized in Table 1, below.

EXAMPLES 10–12

Three catalyzed coating solutions were prepared as in (Comparative) Example 9. These solutions were thoroughly mixed with 1,5, and 7.5 parts of Silane A based on 100 parts solids in said coating solution, respectively. The compositions containing Silane A were used to coat steel panels as in (Comparative) Example 9 (i.e., 2 panels for each coating solution). Evaluations of the respective cured films are again presented in Table 1, below.

EXAMPLES 13–15

Three catalyzed coating solutions were prepared as in Example 9. These solutions were thoroughly mixed with 1, 5, and 7.5 parts of Silane B based on 100 parts solids in said coating solution. The compositions containing Silane B were used to coat steel panels as in (Comparative) Example 9 (i.e., 2 panels for each coating solution). Evaluations of the respective cured films are again presented in Table 1, below.

TABLE 1

| Example No. | Organosilane (Parts per 100 parts solids) | Corrosion Rating | |
|---|---|---|---|
| | | Cured at R.T./2 hr | Cured at 150 C/10 min. |
| 2 (Comparative) | None | 15 | 15 |
| 3 | 1 (Silane A) | 15 | 2 |
| 4 | 5 (Silane A) | 15 | 5 |
| 5 | 7.5 (Silane A) | 15 | 10 |
| 6 | 1 (Silane B) | 10 | 20 |
| 7 | 5 (Silane B) | 5 | 30 |
| 8 | 7.5 (Silane B) | 20 | 50 |
| 9 (Comparative) | None | 15 | 15 |
| 10 | 1 (Silane A) | 15 | 5 |
| 11 | 5 (Silane A) | 20 | 10 |
| 12 | 7.5 (Silane A) | 5 | 10 |
| 13 | 1 (Silane B) | 20 | 5 |
| 14 | 5 (Silane B) | 20 | 8 |
| 15 | 7.5 (Silane B) | 40 | 15 |

(COMPARATIVE) EXAMPLE 16, EXAMPLES 17–22

Catalyzed coating solutions were prepared according to the methods of Examples 2–8. These solutions contained 0, 2, 5 and 10 parts of Silane A or Silane B per 100 parts of solids, as indicated in Table 2, below. The coating solutions were applied to separate panels in the manner described above and cured at room temperature for the times indicated in Table 2.

Relative adhesion of the coatings to the steel substrate was determined by rubbing them with a finger and noting the ease of delamination according to the following criteria:

(E) Excellent Adhesion—Coating is firmly bound to steel surface; coating suffered cohesive failure before it could be removed adhesively from the panel.
(G) Good—Same as above, but adhesive failure is more pronounced.
(F) Fair—Coatings failed adhesively.
(P) Poor—No adhesion observed.

The results of the adhesion testing are also presented in Table 2, below.

TABLE 2

| Example No. | Organosilane (parts per 100 parts solids) | Cure time at R.T. (hours) | Adhesion Rating |
|---|---|---|---|
| 16 (Comparative) | None | 72 | P |
| 17 | 2 (Silane A) | 72 | E |
| 18 | 5 (Silane A) | 72 | E |
| 19 | 10 (Silane A) | 72 | E |
| 20 | 2 (Silane B) | 8 | E |
| 21 | 5 (Silane B) | 8 | E |
| 22 | 10 (Silane B) | 8 | E |

It is evident from Tables 1 and 2 that, not only do the compositions of this invention impart superior adhesion to coatings which are cured at room temperature, but certain of these compositions can also provide improved corrosion resistance, as measured by a standardized salt spray test.

We claim:

1. A composition comprising:
(I) from about 1 to 99 parts by weight of a liquid organopolysiloxane copolymer, prepared by a method comprising (A) forming a homogeneous mixture having an acid number greater than zero and consisting essentially of (a) an organic solvent solution of a resinous copolymeric siloxane containing silicon-bonded hydroxyl radicals and consisting essentially of $R_3SiO_{\frac{1}{2}}$ units and $SiO_{4/2}$ units wherein the ratio of $R_3SiO_{\frac{1}{2}}$ units to $SiO_{4/2}$ units is 0.6:1 to 0.9:1 and each R denotes, independently, a monovalent hydrocarbon radical and (b) a liquid organohydrogenpolysiloxane wherein each organic radical is, independently, a monovalent hydrocarbon radical, there being an average of at least one silicon-bonded hydrogen radical per molecule of said organohydrogenpolysiloxane, and (B) heating said homogeneous mixture to remove substantially all of said organic solvent therefrom;
(II) from about 1 to 99 parts by weight of a hydroxyfunctional diorganopolysiloxane having the average formula $(HO)R'''_2SiO(R'''_2SiO)_cSiR'''_2(OH)$ wherein $R'''$ is a group selected from alkyl, cycloalkyl, haloalkyl, aromatic or haloaromatic radicals and c has a value sufficient to provide a viscosity of about 1 to 1,000,000 Poise at 25° C. for the diorganopolysiloxane; and
(III) from about 0.1 to 10 parts by weight, per 100 parts of said component (I) plus component (II), of at least one organosilane having the formula $QSi(OR'''')_3$ wherein the group Q is selected from vinyl, 3-glycidoxypropyl, 3-methacryloxypropyl or 3-(N-styrylmethyl-2-aminoethylamino)-propyl hydrochloride groups and $R''''$ is selected from alkyl groups having 1 to 4 carbon atoms, alkoxyalkyl groups having a total of up to 5 carbon atoms or the acetyl group.

2. The composition of claim 1, wherein said R group is methyl and said liquid organopolysiloxane copolymer is prepared from a homogeneous mixture having an acid number between 0.1 and 1, on a solids basis.

3. The composition of claim 2, wherein said ratio of $R_3SiO_{\frac{1}{2}}$ units to $SiO_{4/2}$ units has a value of about 0.75.

4. The composition of claim 3, wherein said liquid organohydrogenpolysiloxane is represented by the formula

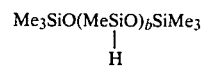

in which Me denotes the methyl radical and b has an average value of 30 to 70.

5. The composition of claim 4, wherein said component (III) is at least one organosilane selected from 3-glycidoxypropyltrimethoxysilane or vinyltriacetoxysilane.

6. The composition of claim 5, wherein said $R'''$ is the methyl radical and said hydroxy-functional diorganopolysiloxane has a viscosity of about 200,000 P at 25° C.

7. The composition of claim 6, wherein 50 parts by weight of said liquid organopolysiloxane copolymer is combined with 50 parts by weight of said hydroxyfunctional diorganopolysiloxane and from about 1 to 5 parts by weight of said organosilane, all proportions being on a solids basis.

8. The composition of claim 1, further comprising a curing amount of a curing catalyst.

9. The composition of claim 5, further comprising a curing amount of a curing catalyst.

10. The composition of claim 6, further comprising a curing amount of a curing catalyst.

11. A metal substrate bearing the cured composition of claim 1.

12. A metal substrate bearing the cured composition of claim 5.

13. A composition comprising:
(I) from about 1 to 99 parts by weight, on a solids basis, of a liquid organopolysiloxane copolymer prepared by a method comprising forming a homogeneous mixture having an acid number greater than zero and consisting essentially of (a) an organic solvent solution of a resinous copolymeric siloxane containing silicon-bonded hydroxyl radicals and consisting essentially of $R_3SiO_{\frac{1}{2}}$ units and $SiO_{4/2}$ units wherein the ratio of $R_3SiO_{\frac{1}{2}}$ units to $SiO_{4/2}$ units is 0.6:1 to 0.9:1 and each R denotes, independently, a monovalent hydrocarbon radical and (b) a liquid organohydrogenpolysiloxane wherein each organic radical is, independently, a monovalent hydrocarbon radical, there being an average of at least one silicon-bonded hydrogen radical per molecule of said organohydrogenpolysiloxane;
(II) from about 1 to 99 parts by weight of a hydroxyfunctional diorganopolysiloxane having the average formula $(HO)R'''_2SiO(R'''_2SiO)_cSiR'''_2(OH)$ wherein $R'''$ is a group selected from alkyl, cycloalkyl, haloalkyl, aromatic or haloaromatic radicals and c has a value sufficient to provide a viscosity of about 1 to 1,000,000 Poise at 25° C. for the diorganopolysiloxane; and
(III) from about 0.1 to 10 parts by weight, per 100 parts on a solids basis of said component (I) plus component (II), of at least one organosilane having the formula $QSi(OR'''')_3$ wherein the group Q is selected from vinyl, 3-glycidoxypropyl, 3-methacryloxypropyl or 3-(N-styrylmethyl-2-aminoethylamino)-propyl hydrochloride groups and $R''''$ is selected from alkyl groups having 1 to 4 carbon atoms, alkoxyalkyl groups having a total of up to 5 carbon atoms or the acetyl group.

14. The composition of claim 13, wherein said R group is methyl and said liquid organopolysiloxane copolymer is prepared from a homogeneous mixture having an acid number between 0.1 and 1, on a solids basis.

15. The composition of claim 14, wherein said ratio of $R_3SiO_{\frac{1}{2}}$ units to $SiO_{4/2}$ units has a value of about 0.75.

16. The composition of claim 15, wherein said liquid organohydrogenpolysiloxane is represented by the formula

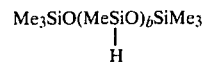

in which Me denotes the methyl radical and b has an average value of 30 to 70.

17. The composition of claim 1-6, wherein said component (III) is at least one organosilane selected from 3-glycidoxypropyltrimethoxysilane or vinyltriacetoxysilane.

18. The composition of claim 17, wherein said $R'''$ is the methyl radical and said hydroxy-functional diorganopolysiloxane has a viscosity of about 200,000 P at 25° C.

19. The composition of claim 18, wherein 50 parts by weight of said liquid organopolysiloxane copolymer is combined with 50 parts by weight of said hydroxy-functional diorganopolysiloxane and from about 1 to 5 parts by weight of said organosilane, all proportions being taken on a solids basis.

20. The composition of claim 13, further comprising a curing amount of a curing catalyst.

21. The composition of claim 17, further comprising a curing amount of a curing catalyst.

22. The composition of claim 18, further comprising a curing amount of a curing catalyst.

23. A metal substrate bearing the cured composition of claim 13.

24. A metal substrate bearing the cured composition of claim 17.

* * * * *